(No Model.) 3 Sheets—Sheet 1.

T. T. H. HARWOOD.
FLOATING DERRICK.

No. 520,676. Patented May 29, 1894.

Witnesses.

Inventor.
Thomas T. H. Harwood (No Model.)  T. T. H. HARWOOD.  3 Sheets—Sheet 2.
FLOATING DERRICK.

No. 520,676.  Patented May 29, 1894.

Witnesses.
Lauritz N. Möller.
Alice A. Perkins.

Inventor.
Thomas T. H. Harwood
by Alban Andrén
his atty (No Model.) 3 Sheets—Sheet 3.
T. T. H. HARWOOD.
FLOATING DERRICK.
No. 520,676. Patented May 29, 1894.
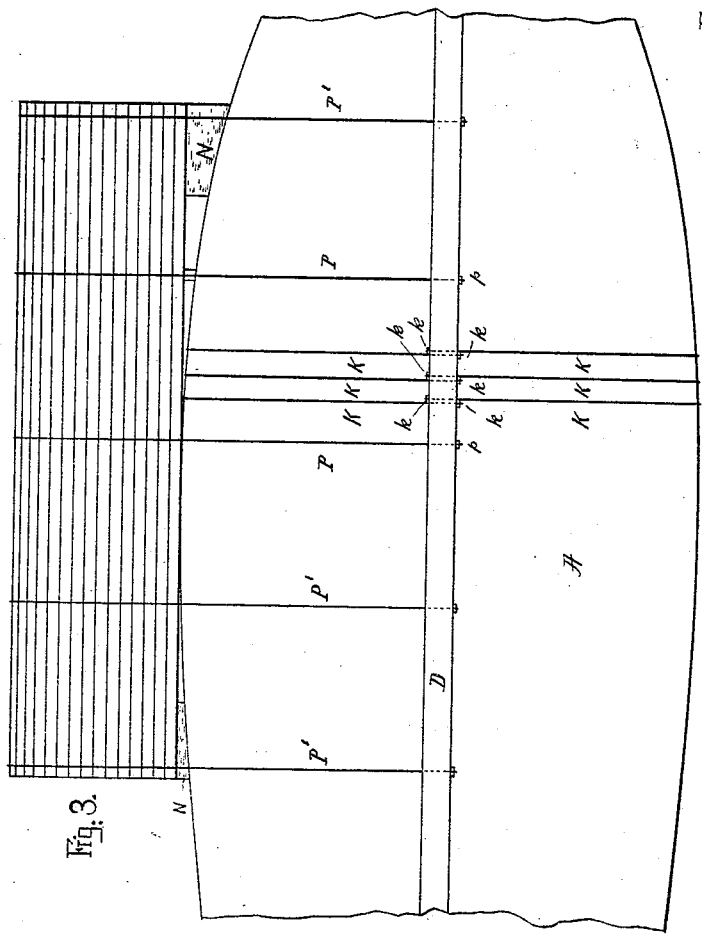
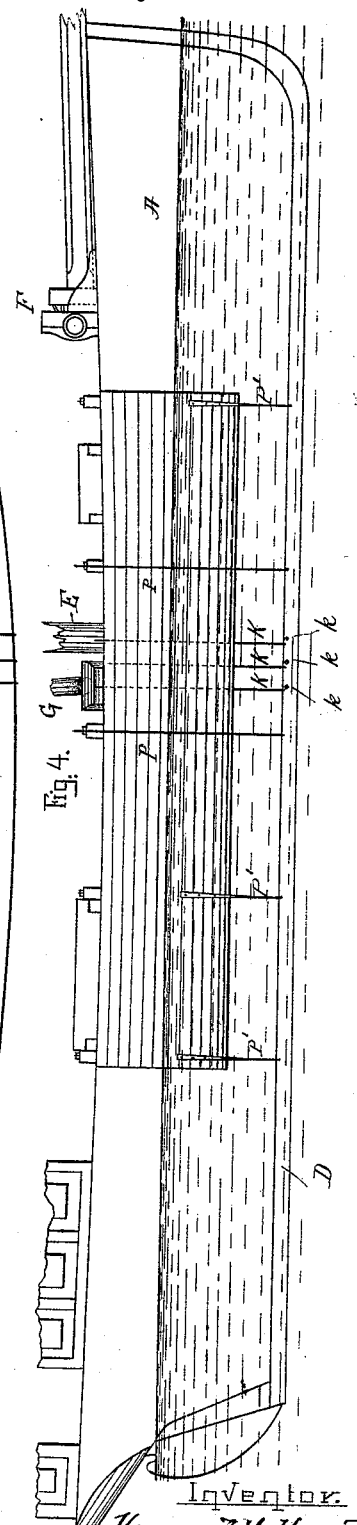
Witnesses.
Lauritz N. Möller
Alice A. Perkins
Inventor.
Thomas T. H. Harwood
by his atty. Alban Andrén

UNITED STATES PATENT OFFICE.

THOMAS T. H. HARWOOD, OF ROCKPORT, MASSACHUSETTS.

FLOATING DERRICK.

SPECIFICATION forming part of Letters Patent No. 520,676, dated May 29, 1894.

Application filed March 16, 1893. Serial No. 466,284. (No model.)

*To all whom it may concern:*

Be it known that I, THOMAS T. H. HARWOOD, a citizen of the United States, and a resident of Rockport, in the county of Essex and State of Massachusetts, have invented new and useful Improvements in Floating Derricks, of which the following, taken in connection with the accompanying drawings, is a specification.

This invention relates to improvements in floating derricks for the purpose of loading or unloading stones or other heavy articles or materials and it is particularly well adapted for the purpose of building break-waters, sea walls, &c., although it may equally well be used for any other purpose to which a floating derrick is applicable.

The object of my invention is to increase the base or displacement of an ordinary scow, lighter or other comparatively narrow vessel by means of a ponton detachably secured to one side of the vessel, which acting as a counterpoise or balance device, enables the floating derrick to be used in lifting heavy weights which could not be lifted on the same vessel if such ponton were not employed. By such arrangement an ordinary scow of comparative light draft may easily be converted into a floating derrick of great capacity for raising or lowering very heavy weights as will hereinafter be more fully shown and described, reference being had to the accompanying drawings, wherein—

Figure 1:
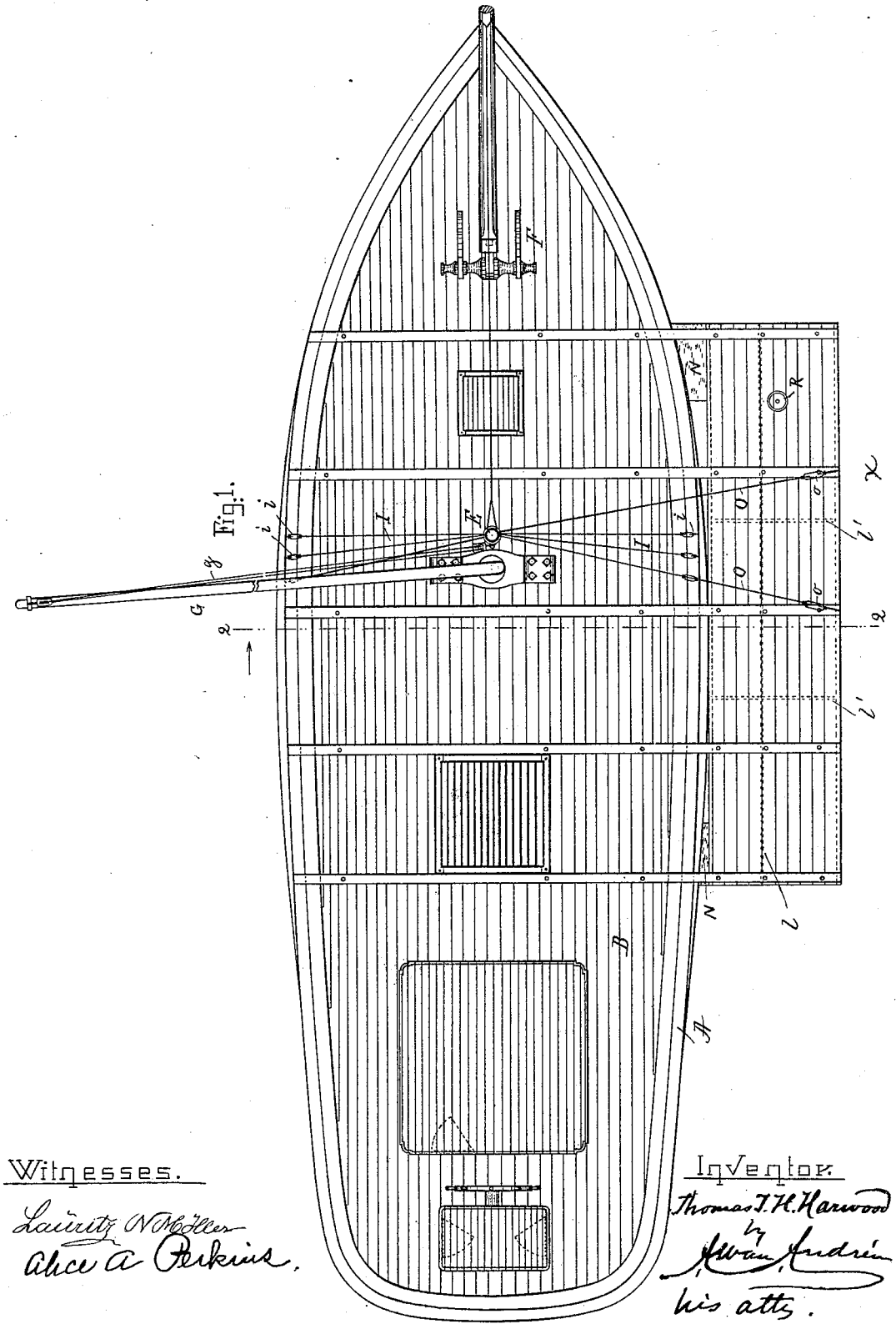
Figure 2:
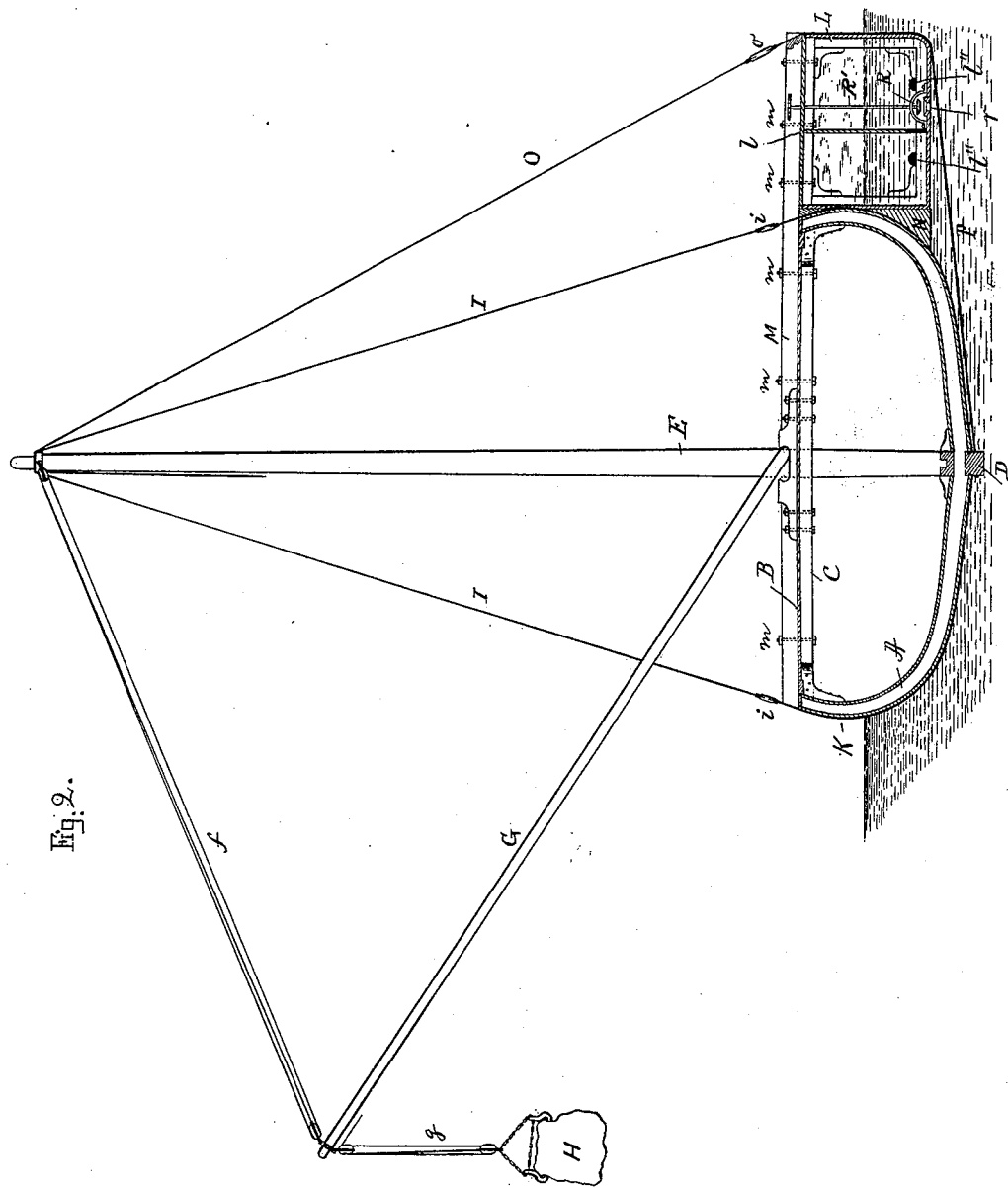

Figure 1 represents a plan view of my improved floating derrick. Fig. 2 represents a cross-section on the line 2—2 shown in Fig. 1. Fig. 3 represents a partial bottom view of the floating derrick; and Fig. 4 represents a side elevation as seen from X in Fig. 1.

Similar letters refer to similar parts wherever they occur on the different parts of the drawings.

A represents an ordinary scow, lighter or other vessel on which B is the deck, C the deck beams and D the keel as usual.

E is a mast passing through the deck and stepped at its lower end in the keel or keelson of the vessel in the ordinary way.

F is a suitable hoisting machine, or winch, arranged on the deck of the vessel; G is the boom or crane as usual pivoted in its lower end in a socket or otherwise as is common in floating derricks.

*f* and *g* represent the hoisting ropes as usual, and H in Fig. 2 represents a stone, weight or other article to be raised or lowered by the hoisting device.

I, I, represent the shrouds or side stays for the mast, which are secured to the upper portion of the latter and in their lower ends preferably by means of turn buckles *i* to metal straps K going from opposite sides of the vessel and following the outside contour of the hull thereof are attached to opposite sides of the keel preferably by means of nuts *k*, *k*, as shown in the drawings, and by this arrangement the mast is firmly secured to the main structure of the vessel in such a manner as to prevent wrenching and straining and consequent leakage of the hull when the derrick is used.

L represents the ponton or air tight box of a suitable length which is secured at the side of the vessel A by means of transverse beams M, M, attached to the said ponton L and deck beams of the vessel by screw bolts *m*, *m*, as shown in Figs. 1 and 2.

Between the adjacent sides of the vessel and ponton I prefer to locate suitably shaped blocks N, N, for the purpose of preventing chafing of the said vessel and ponton.

In practice I prefer to secure the ponton L to the side of the vessel A by means of stays O, O, attached in their upper ends to the upper portion of the mast E and having their lower ends attached by means of turn buckles *o*, *o*, to metal straps P, P, going outside of and below the ponton and attached to the keel D by means of nuts *p*, *p*, as shown in the drawings. P', P', are additional metal straps for securing the ponton to the vessel A.

The interior of the ponton L is preferably divided into compartments by means of longitudinal and cross walls or partitions *l*, *l'* for the purpose of preventing the water in the said ponton from dashing fore and aft or sidewise when using the derrick in choppy seas or windy weather. The said partitions may be provided with suitable perforations *l''*, *l''*, shown in Fig. 2 for the purpose of establishing a free communication between the various compartments in the ponton.

*r* is an opening in the bottom of the ponton L which may be closed by means of a suitable valve R having an operating stem or rod R' extending vertically through the ponton to the deck or upper side thereof, whereby the valve can be conveniently opened or closed. By this means the ponton may be filled more or less with water, the body of which will serve as a counterpoise with an increased leverage during the hoisting operation.

When no longer required as a floating derrick, the ponton may be easily detached from the vessel A and the latter may then be used as an ordinary scow, lighter or vessel for any desired purpose. It will thus be seen that by the use of the ponton in connection with a suitable vessel the breadth of beam of the latter is increased as well as a counterpoise provided by which the derrick is balanced to permit comparatively heavy objects to be raised and lowered by the boom and its hoisting mechanism thus readily converting an ordinary small vessel into a floating derrick of great capacity for work.

The water in the ponton acts as a counterweight in steadying the vessel when the object that is being hoisted and the boom G are at the opposite side of the ponton. In case the boom is swung to the same side with the ponton the air within the upper portion of the latter will serve by its buoyancy to prevent in a great measure the vessel from being inclined too much in the direction of the position of the load during the hoisting operation.

Having thus fully described the nature, construction, and operation of my invention, I wish to secure by Letters Patent and claim—

The combination with a floating vessel, of ponton-supporting beams rigidly secured to the deck of the vessel and extending laterally from one side thereof, a hollow air-tight ponton attached to said beams and supported thereby, anti-chafing blocks arranged between the side of the vessel and the ponton, and means for supplying water to the interior of the ponton, substantially as described.

In testimony whereof I have signed my name to this specification, in the presence of two subscribing witnesses, on this 9th day of March, A. D. 1893.

THOMAS T. H. HARWOOD.

Witnesses:
ALBAN ANDRÉN,
LAURITZ N. MÖLLER.